(12) United States Patent
Loprete

(10) Patent No.: US 6,494,689 B2
(45) Date of Patent: Dec. 17, 2002

(54) LOOSE LAMINA MOTOR STATOR

(75) Inventor: Joseph F. Loprete, Bristol, TN (US)

(73) Assignee: Scroll Technologies, Arkadelphia, AK (US)

( * ) Notice: Subject to any disclaimer, the term of this patent is extended or adjusted under 35 U.S.C. 154(b) by 0 days.

(21) Appl. No.: 09/814,015

(22) Filed: Mar. 21, 2001

(65) Prior Publication Data

US 2002/0136648 A1 Sep. 26, 2002

(51) Int. Cl.$^7$ ................................................ F04B 35/04
(52) U.S. Cl. ..................... 417/410.5; 310/216; 310/217; 310/42
(58) Field of Search ................ 417/410.5; 310/216, 310/217, 42

(56) References Cited

U.S. PATENT DOCUMENTS

| 4,796,352 A | * | 1/1989 | Kawada et al. ............... 29/596 |
| 5,784,784 A | * | 7/1998 | Flanigan et al. ......... 29/890.08 |
| 6,163,949 A | * | 12/2000 | Neuenschwander .......... 29/521 |

* cited by examiner

Primary Examiner—Charles G. Freay
Assistant Examiner—Emmanuel Sayoc
(74) Attorney, Agent, or Firm—Carlson, Gaskey & Olds

(57) ABSTRACT

A motor stator of a scroll compressor is formed of a plurality of force fit uncoated plates. As the outer periphery of the uncoated plates is slightly greater than the inner periphery of the housing, the plates are secured to the housing without the need of a coating. After force fitting the plates into the housing, a tool positioned above and below the plates presses the uncoated plates together to eliminate any space between the plates, forming a solid motor stator.

4 Claims, 3 Drawing Sheets

LOOSE LAMINA MOTOR STATOR

BACKGROUND OF THE INVENTION

The present invention relates generally to a stator for use with a sealed compressor.

Sealed compressors are utilized in many refrigerant compression applications. In a typical sealed compressor, a pump unit is incorporated within a hermetically sealed housing. A refrigerant is introduced into a suction chamber in the housing through a suction tube. Typically, an electric motor drives a shaft which powers the pump unit. The refrigerant passes over and cools the motor.

One type of sealed compressor is a scroll compressor. A scroll compressor includes two opposed interfit scroll members each having a base and a generally spiral wrap extending from the base. One of the two scroll members is driven to orbit relative to the other. As the wraps orbit, compression chambers defined between the wraps are reduced in volume. After being compressed, the refrigerant is passed to a discharge chamber.

The motor of a scroll compressor includes a motor rotor positioned within a stator. Stator windings carry electricity through the stator, driving the rotor and causing the shaft to rotate. In prior compressors the stator is bolted or glued into the housing.

Typically, a stator is formed of a plurality of plates. In prior sealed compressors, the plates are typically coated to secure the plates together. Recently, the stators with coated plates have also been force fit into the housing.

SUMMARY OF THE INVENTION

The present invention relates to a stator for use with a sealed compressor.

Although preferably useful in a scroll compressor, the invention could also be used in other types of sealed compressors.

The motor stator of the present invention is formed of a plurality of uncoated plates force fit into a housing of a scroll compressor. As the diameter of the outer periphery of the plates is slightly greater than the diameter of the inner periphery of the housing, the force fitting process secures the plate in the housing. As the uncoated plates are force fit into the housing, a tool presses the uncoated plates together to eliminate any looseness which exists between the plates at the outer periphery. By this process, a substantially solid motor stator is formed. Once the stator is inserted, a motor rotor is positioned within the aperture formed by the inner peripheries of the plates. Since the plates are force fit in the housing of the scroll compressor, a coating is not required to secure the plates together.

Accordingly, the present invention provides a lese expensive stator motor for use with a sealed compressor.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
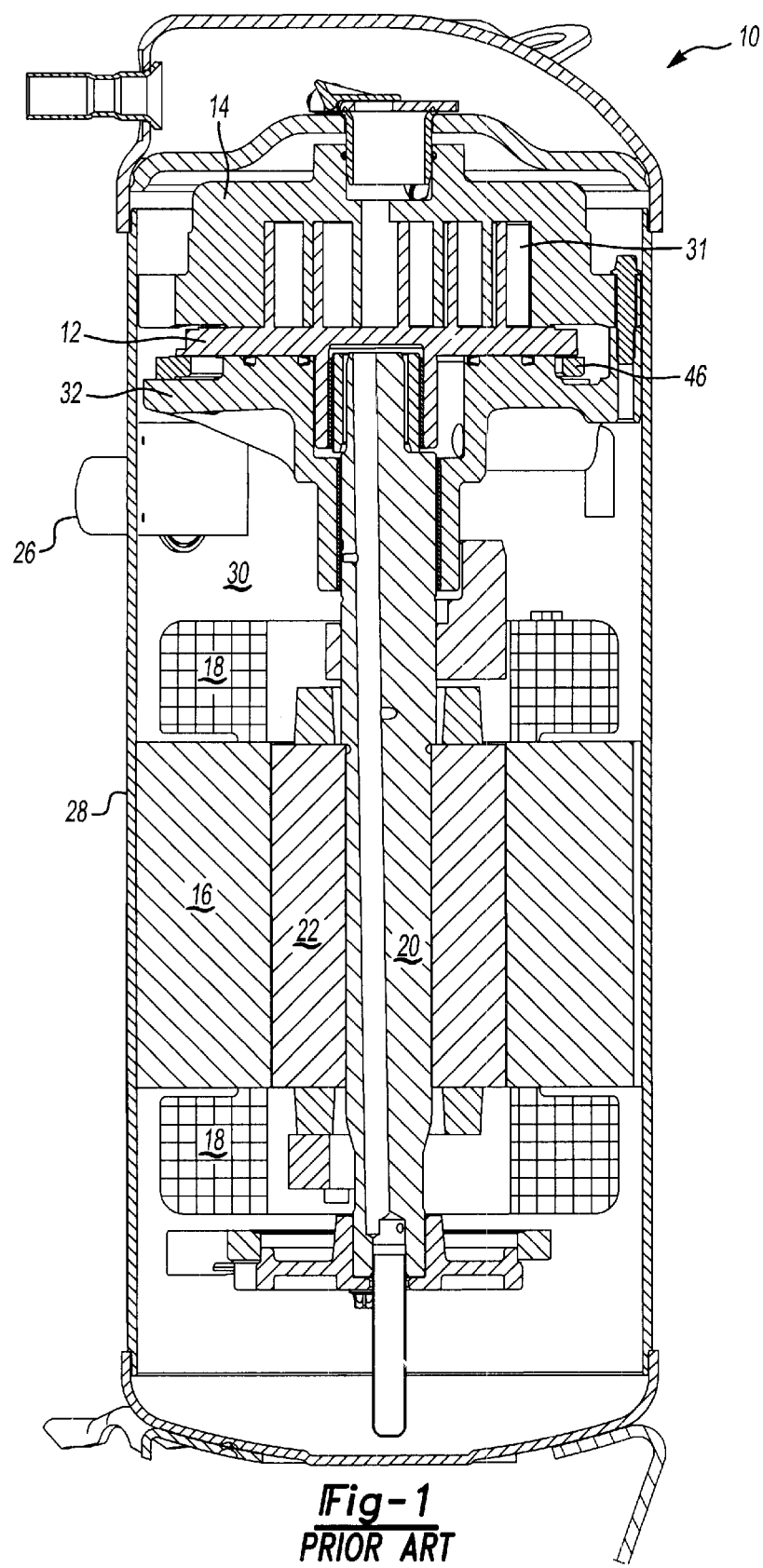
FIG. 1 illustrates a cross sectional view of a prior art scroll compressor.

A known sealed compressor 10 is illustrated in FIG. 1. The compressor 10 is shown as a scroll compressor having an orbiting scroll 12 and a non-orbiting or fixed scroll 14. While the invention shown is a scroll compressor, it could also extend to other types of sealed compressors. A motor stator 16 includes the typical stator windings 18. Stator 16 drives a rotor 22 to rotate, driving a shaft 20. In prior compressors, the motor stator 16 is formed of a plurality of coated plates and has typically been bolted or otherwise secured into a housing 28. The coating secures the plates together, forming a prior art solid motor stator 16.

A suction tube 26 enters the housing 28 and supplies refrigerant to scroll compressor chambers 31. As shown, a crankcase 32 supports the orbiting scroll 12. A coupling 46 is utilized to prevent rotation of the orbiting scroll 12 and cause orbital motion.

Figure 2:
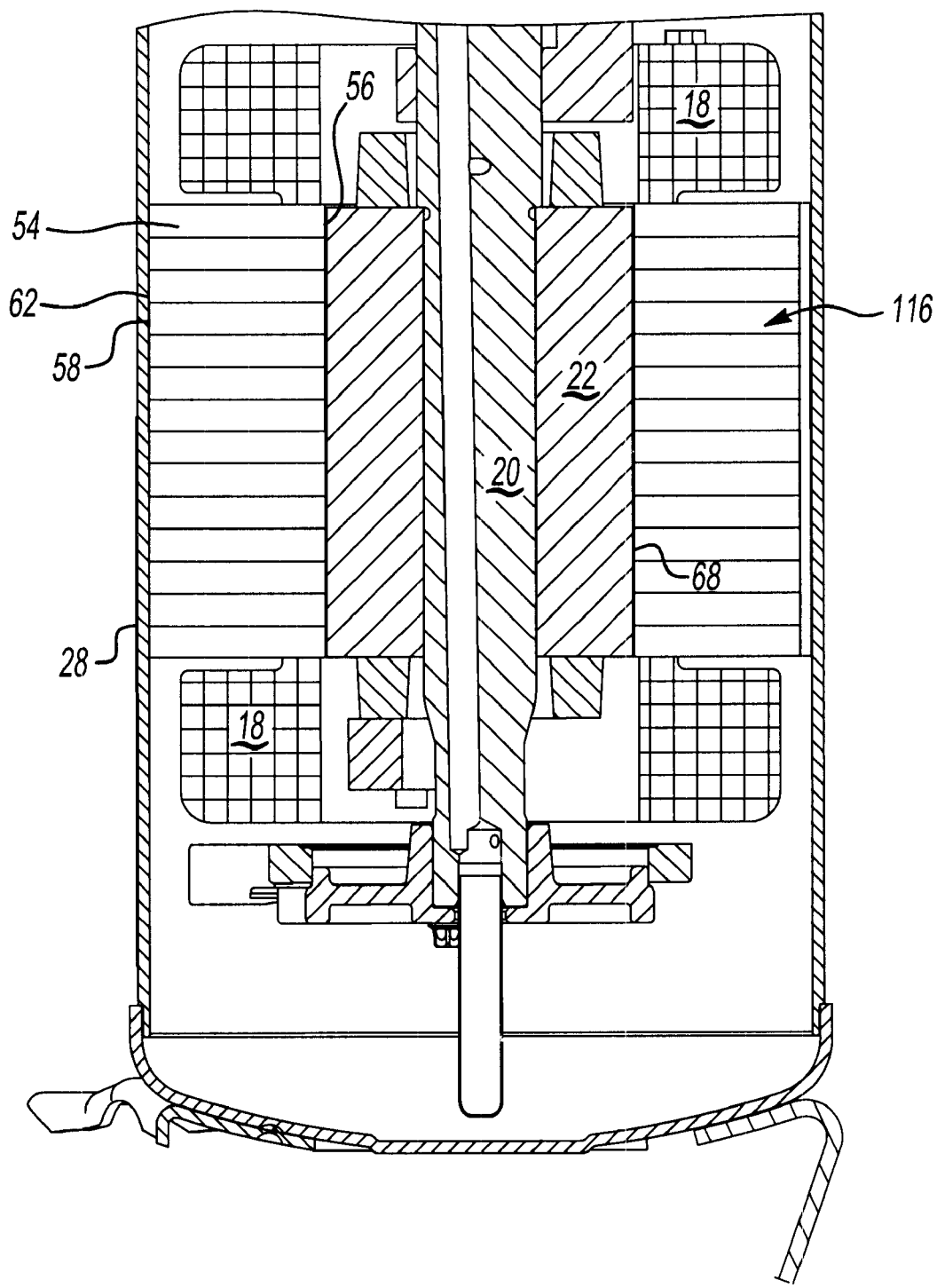
FIG. 2 illustrates a cross sectional view of a scroll compressor employing a motor stator formed of uncoated force fit plates.

In the scroll compressor of the present invention, as illustrated in FIG. 2, the motor stator 116 is formed of a plurality of force fit uncoated plates 54, each of the plates 54 including an inner periphery 56 and an outer periphery 58. As the outer periphery 58 of the plurality of uncoated plates 54 is slightly greater than diameter of the inner periphery 62 of the housing 28, the uncoated plates 54 are force fit into the housing 28. By force fitting the slighter larger uncoated plates 54 into the slightly smaller housing 28, the plates 54 are secured within the housing 28 at fixed positions relative to each other. As such, the prior art coating is no longer necessary. The concept of force fitting the stator 116 by having the plates 54 having a greater outer periphery 56 is known. The force fit stators have, however, been coated with the coating as described above.

Figure 3A:
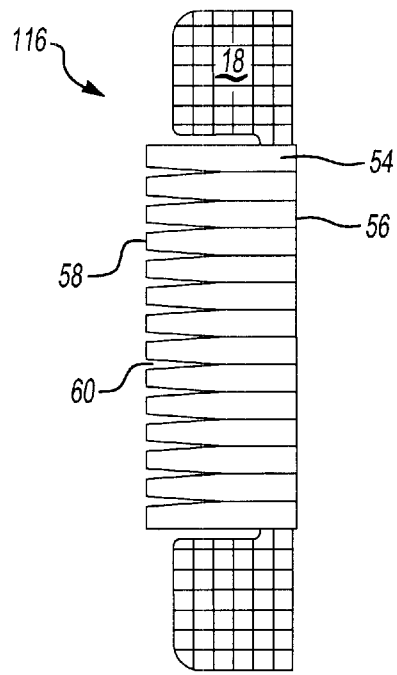
FIG. 3A illustrates a cross sectional view of the motor stator of the present invention prior to being force fit into the housing.

FIG. 3A illustrates the motor stator 116 of the present invention prior to being force fit into the housing 28. Prior to being force fit, the uncoated plates 54 of the motor stator 116 are secured proximate to the inner periphery 56 by wires forming the stator windings 18. The uncoated plates 56 are unsecured proximate to the outer periphery 58 of the uncoated plates 56. A space 60 is illustrated existing between each plate 56. The size of the space 60 is illustrated to an exaggerated degree simply to show the fact that the plates are unsecured to each other at the outer periphery.

Figure 3B:
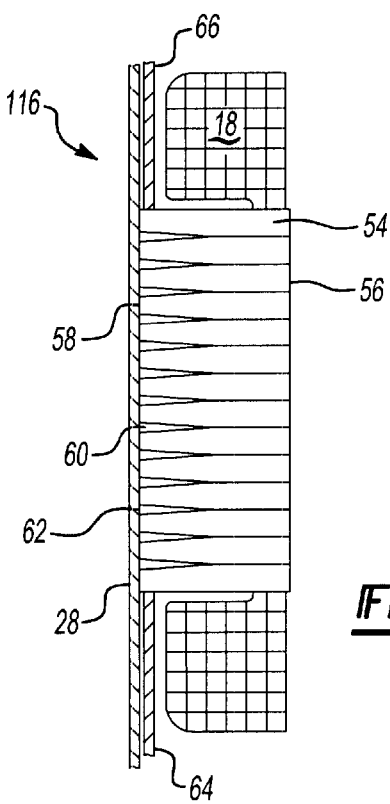
FIG. 3B illustrates a cross sectional view of the motor stator of the present invention after being force fit into the housing.
Figure 3C:
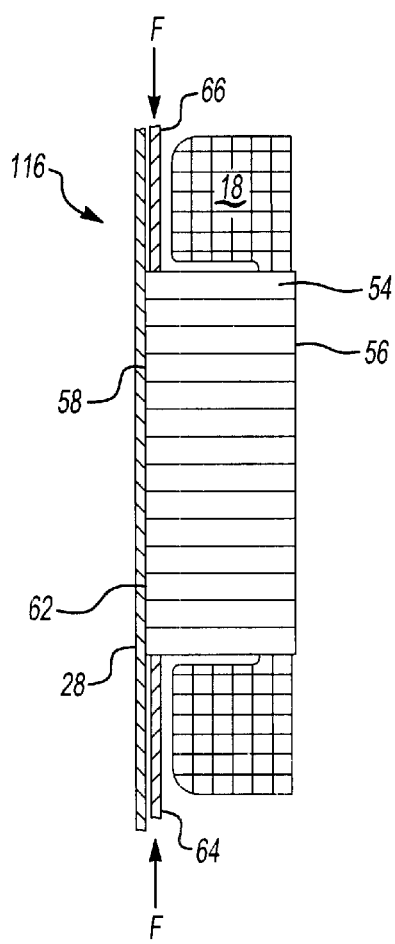
FIG. 3C illustrates a cross sectional view of the motor stator of the present invention after a tool presses the plates together.

FIG. 3B illustrates the motor stator 116 being force fit into the housing 28. The space 60 exists between the plates 56. As illustrated in FIG. 3C, as the motor stator 116 is force fit into the housing 28, a lower tool 64 and an upper tool 66 press the plates 54 together to eliminate the spaces 60 and form a substantially solid motor stator 116. Since the force fit plates 54 are all secured relative to the housing 28, and thus relative to each other, the fact that they are uncoated does not cause any concern since they are all secured by the housing 28 itself Once the motor stator 116 is assembled, a motor rotor 22 is positioned within an aperture 68 formed by the inner peripheries 56 of the plates 54. The stator 116 provides electricity to the rotor 22 from the stator windings 18, allowing the rotor 22 to rotate. By force fitting the uncoated plates 54 into the housing 28, the plates are secured within the housing 28. A coating is therefore not required to secure the plates 54 together.

The foregoing description is only exemplary of the principles of the invention.

Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A sealed compressor comprising:

a pump unit mounted within a housing, said pump unit being driven by an electric motor, and said motor including a rotor which drives said pump unit and a stator including a plurality of substantially uncoated plates having an outer circular diameter greater than an inner periphery of said housing, said plates being secured to said housing by a force fitting within said inner periphery of said housing.

2. The compressor as recited in claim 1 wherein said pump unit is a scroll pump unit.

3. The compressor as recited in claim 1 wherein each of said plurality of plates is substantially unsecured to others of said plurality of plates proximate to an outer periphery.

4. A method for forming a stator of a motor of a sealed compressor comprising the steps of:

(1) providing a stator preform including a plurality of plates which are uncoated, and which includes stator windings securing said plurality of plates, with said plurality of plates being unsecured at an outer periphery;

(2) inserting said preform into a seated compressor housing, said plates having an outer circular diameter which is greater than an inner periphery of said housing, such that the insertion provides a force fit;

(3) force fitting said plurality plates into said housing; and (4) applying a pressure to said plurality of plates to eliminate a space which exists between each of said plurality of plates.

\* \* \* \* \*

UNITED STATES PATENT AND TRADEMARK OFFICE
CERTIFICATE OF CORRECTION

PATENT NO.      : 6,494,689 B2
DATED           : December 17, 2002
INVENTOR(S)     : Loprete It is certified that error appears in the above-identified patent and that said Letters Patent is hereby corrected as shown below:

<u>Title page,</u>
Items [54] and [73] should be corrected to read as shown:
-- [54]   AN UNCOATED LOOSE LAMINA MOTOR STATOR FOR A COMPRESSOR, AND A METHOD FOR FORMING THE MOTOR STATOR WITHIN A COMPRESSOR HOUSING USING A FORCE FIT PROCESS --

[73]   Scroll Technologies, Arkadelphia, AR (US) --

Signed and Sealed this

Fifteenth Day of July, 2003

JAMES E. ROGAN
*Director of the United States Patent and Trademark Office*